US009457981B2

(12) United States Patent
Westcott et al.

(10) Patent No.: US 9,457,981 B2
(45) Date of Patent: Oct. 4, 2016

(54) SYSTEM AND METHOD FOR SORTING SCANNED DOCUMENTS TO SELECTED OUTPUT TRAYS

(71) Applicant: Kodak Alaris Inc., Rochester, NY (US)

(72) Inventors: Robert M. Westcott, Holley, NY (US); Randall Maysick, Churchville, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 14/579,541

(22) Filed: Dec. 22, 2014

(65) Prior Publication Data

US 2016/0122148 A1 May 5, 2016

Related U.S. Application Data

(60) Provisional application No. 62/075,131, filed on Nov. 4, 2014.

(51) Int. Cl.

| B65H 5/02 | (2006.01) |
|---|---|
| B65H 31/24 | (2006.01) |
| B65H 5/06 | (2006.01) |
| B65H 5/26 | (2006.01) |
| B65H 1/04 | (2006.01) |
| B65H 7/02 | (2006.01) |
| B65H 7/20 | (2006.01) |
| B65H 43/00 | (2006.01) |

(Continued)

(52) U.S. Cl.
CPC ............... B65H 31/24 (2013.01); B65H 1/04 (2013.01); B65H 5/06 (2013.01); B65H 5/26 (2013.01); B65H 7/02 (2013.01); B65H 7/20 (2013.01); B65H 37/04 (2013.01); B65H 43/00 (2013.01); H04N 1/00588 (2013.01); H04N 1/00602 (2013.01); H04N 1/00641 (2013.01); H04N 1/00694 (2013.01); H04N 1/00745 (2013.01); B65H 2511/413 (2013.01)

(58) Field of Classification Search
CPC ............ B65H 31/24; B65H 2301/544; B65H 2511/413; B65H 2801/39
See application file for complete search history.

(56) References Cited

U.S. PATENT DOCUMENTS 5,545,381 A * 8/1996 Iida .......................... B41J 29/26
209/576
7,992,853 B2 8/2011 Hayduchok et al.
(Continued)

FOREIGN PATENT DOCUMENTS

WO 2013/168817 11/2013

OTHER PUBLICATIONS

International Search Report and Written Opinion dated Feb. 2, 2016 in corresponding PCT application No. PCT/US15/58801.

*Primary Examiner* — Howard Sanders
(74) *Attorney, Agent, or Firm* — Hogan Lovells US LLP (57) ABSTRACT

An image scanner system and method with document sorting capability that includes the ability to sort based on image content is described. A processor instructs drive motors and rollers of the transport system moving the document along a transport path within the scanner to stop movement, such that document is stopped at a position after it is imaged to provide time for the processor to analyze the image content and make a sorting decision. The transport system is then restarted and the document is delivered to a paper path switching mechanism to provide the physical sort. Based on the processing, the switching mechanism is positioned such that the document will follow a transport path into a desired output tray. The system may reverse the transport system to back up the document before being restarted in order to allow for paper path switching of longer documents.

13 Claims, 9 Drawing Sheets

(51) Int. Cl.
  *B65H 37/04*  (2006.01)
  *H04N 1/00*  (2006.01)

(56) References Cited

U.S. PATENT DOCUMENTS 8,730,529 B2   5/2014  Link et al.
2007/0127090 A1   6/2007  Nonaka
2009/0237754 A1   9/2009  Kusama
2011/0049788 A1*  3/2011  Suzuki .................... B65H 1/06
                                                    271/145
2012/0217188 A1   8/2012  DeWitt et al.
2012/0307314 A1* 12/2012  Sugizaki ................ B65H 29/62
                                                    358/402
2014/0198357 A1   7/2014  Shibata

* cited by examiner

SYSTEM AND METHOD FOR SORTING SCANNED DOCUMENTS TO SELECTED OUTPUT TRAYS

CROSS-REFERENCE TO RELATED APPLICATIONS

This application claims the benefit of U.S. Provisional Application No. 62/075,131, filed Nov. 4, 2014, and hereby incorporates by reference the provisional application in its entirety.

BACKGROUND OF THE INVENTION

Documents are typically fed into document scanners from input trays, and then transported past image capture devices which acquire images of the documents being scanned. The images captured are then stored in a buffer memory and analyzed by an image processor. Following the imaging, the documents are then output into one or more output trays. When more than one output tray is provided, it is possible to sort the various documents being scanned into different trays, based on one or more characteristics of the document. These characteristics can involve document size, shape, or thickness. More recently, scanners have been able to sort the documents based on the content of the captured images.

However, in scanners that have provided sorting based on image content, the transport is designed to maximize the distance from the image capture devices to one or more paper path switching mechanisms that move a document onto a selected transport path for one of the output trays. By providing large distances between the image devices and the switching mechanisms, the prior art scanners provide time to for processors within the scanners to analyze the image, understand content in the image, and make a decision for the paper path switch position to guide the document onto the proper transport path to be output into a chosen tray. Each paper path switching mechanism typically consists of a mechanical blade like member that can be moved to two or more positions by a motor or other primary mover, such as a solenoid. When the blade member is moved to one of the two positions, the blade geometry directs the leading edge of a sheet into a given paper path and when the blade member is moved to another position the geometry of the blade member directs the sheet into an alternate paper path In order to accomplish the sorting, the prior art systems require that the distance between the image capture devices and the paper path switch generally needs to be much longer than the document length in order to provide for the processing time. This in turn leads to increased size and cost of the overall scanner product. The increased size aspects of this approach can also diminish the ergonomics of the scanner, especially for a seated operator.

SUMMARY OF THE INVENTION

The present invention provides a document scanning system and method for sorting scanned document sheets into one more output trays. The system and method is able to sort documents into different output trays based on their length, color, or detected presence of a bar code of a particular type or number. Using image processing techniques such as OCR recognition, the system and method may also classify the document as being of a particular type such as an invoice or a purchase order. The system and method may then use this document type information to sort the document sheets into particular trays. For example, using OCR recognition processing, the document sheet may be sorted based on a numerical value, name, picture, image, or other text or icon found in a given field or region on the document.

In the system and method described herein, a document sheet is imaged by transporting it into a document scanner and past one or more image devices, such as cameras, along a paper path. The imaging devices illuminate the document sheet and create a digital image of the sheet. The document sheet is moved along the paper path by rollers, and the sheet may be stopped at a position along the path shortly after the sheet has been imaged. Once stopped, the digital image can be analyzed for content, such as the presence of a bar code or other image content. If the content matches with a preset definition of content set by the operator, the sheet can then be directed to a particular one of a plurality of output destinations by restarting the sheet motion along the paper path and utilizing a switch mechanism to direct the sheet into the desired output destination.

In addition to making a sorting decision based on an image analysis performed by the processor while the document is within the scanner, the scanner system and method may perform other functions prior to moving the a scanned document sheet to an output destination and advancing the next sheet into the system. For example, the system may print on the sheet based on information obtained from analyzing the image. In addition, the system may send a message to an operator control panel so that the scanner operator may interact with the sheet as it is delivered. The ability to provide the time for processor to perform image analysis in order to make decisions about the image information or the sheet control can be done in a scanner layout that is more compact, lower cost and more ergonomic by eliminating the need to have long sections of paper path.

DETAILED DESCRIPTION OF THE INVENTION

Figure 1:
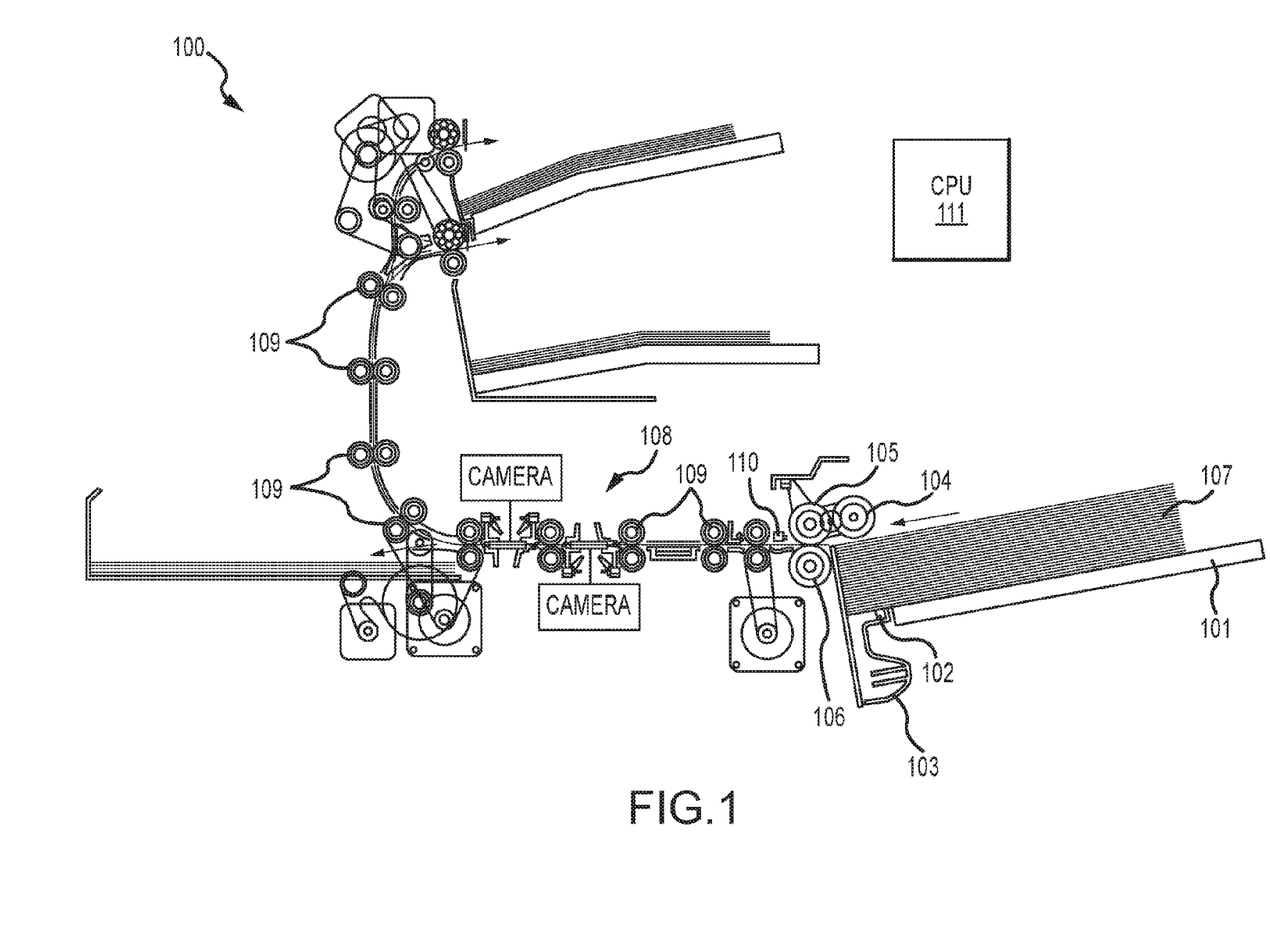
FIG. 1 illustrates a document scanning system including an input tray, paper path, and multiple output trays.

The present invention is directed to a system and method for scanning document sheets, and sorting the scanned sheets into a particular one of a plurality of output trays. As shown in FIG. 1, a document scanning system 100 includes an input tray 101 on which a stack of sheets 107 is supported. The input tray contains a sensor 102 to detect the presence of a document sheet, or other media to be imaged, in the tray. The tray is equipped with an elevator system 13 that when commanded in response to sensing paper drives the tray 101 up in order to bring the top sheet of the stack 107 to a preferred vertical position for feeding. This can be done automatically or it can be linked to a customer command via a control panel button push. A feeder system comprising one or more driven rollers including an urging roller 104 and a feeder roller 105 is engaged to pick the top sheet from the stack and advance it into the scanner transport to be moved along the paper path 108. A separator 106, which is generally a torque limited retard roller and/or frictional pad, applies an opposing force to selectively separate the top or intended sheet from the rest of the stack. The feed system then advances the intended sheet to driven rollers 109 within the scanner paper path 108 that then drive the sheet through the path. One or more sensors 110 may be positioned directly downstream of the feeder system to detect the entry of the sheet's leading edge as well as the trailing edge of the sheet as it has passes the sensor. These sensors may be optical interrupt type sensors where IR light from one side of the path is directed to a detector on the opposite side of the path, and when a sheet passes between the detector and the light source and interrupt is generated indicating the arrival or departure of a sheet's leading or trailing edge. Alternatively, the sensors may include an ultrasonic transmitter and receiver on opposite sides of the paper path that can detect the presence of paper by monitoring the amplitude of a constant sound source signal delivered by the transmitter signal and received by the receiver component. There is a difference in the amplitude of this receiver signal based on whether the sound is traveling through air (no paper present) or paper. In order to get an accurate position of the sheet's leading or trailing edges, there are usually several of these sensors in a line perpendicular to the sheet's travel. The system is then able to account for skew or irregular edge geometry and insure a better position indication as compared with a single sensor location. This sensor signals are fed to a central processing unit 111 associated with the scanning unit to track the sheet's position for the remainder of the sheet's travel until it exits the paper path. The processing unit may be within the scanner, or may be external to the scanner and in communication with the sensors and devices therein. Using software timers the central processing unit can determine and predict the position of the leading and trailing edges based on this initial sensing and how the drive system is programmed to move the sheet.

Figure 2:
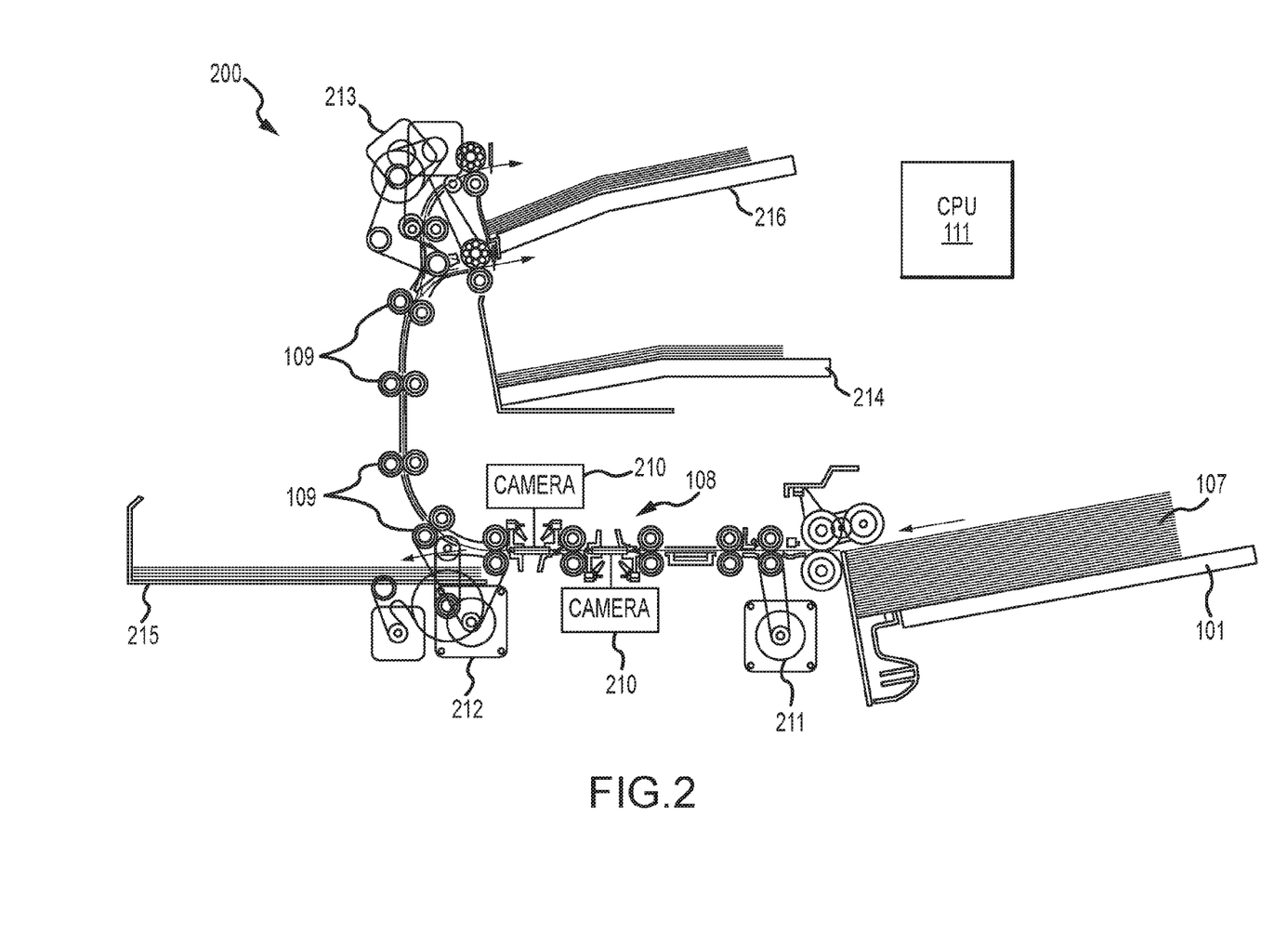
FIG. 2 illustrates the document scanning system, showing the cameras to capture images of documents and the drive mechanisms for moving document sheets along the paper transport path.

As seen in FIG. 2, on either side of the path 108 there are two cameras 210 equipped with linear sensors that work in conjunction with optics and illumination components to digitize an image of the sheet as it advances at a specified velocity past them. The sheet is advanced along the path 108 by drive motors 211, 212, 213 that turn the paper transport rollers 109. The digitized data from the two cameras are sent the central processing that converts the data into 2-dimensional images of the sheets. In addition, the processor unit includes digital signal processors executing software programs to decode various forms of information from these 2D images. For example, the processor may perform detection and decoding of bar codes from the image of the sheet. If a bar code is detected, the processor may extract information from the barcode and compare it to previously stored rules information for comparison and or matching. The previously stored rules information may be input by a scanner operator, or may be standard rules preprogrammed in the processor. Based on the rules, the scanner system may alter the output tray destination for the document sheet. Many other image attributes can be detected and understood using various image processing algorithms common within the Scanner industry. For example, color detection, OCR data from certain areas of the document, or form topography may be analyzed, and rules may be stored for depositing the scanned sheet into a certain output tray based on the analysis. In scanning modes that do not require the sheets to be placed into multiple output locations, the sheet is delivered via driven rollers 109 that are down stream of the cameras through a primary paper path to one primary output destination 214 without any stopping or reversing of direction. This output destination is a support tray 214 to receive and hold the documents as they are exited from the driven rollers of the scanner paper path.

When it is desirable to sort the sheet to determine whether to sort a scanned sheet to the primary output destination 214 or to an alternative output destination 215, 216, the image data can be analyzed by the processing system 111, and the sheet can be directed to the primary output destination or one of a plurality of alternative out destination based on the content or other characteristics of the sheet as determined by the processing system.

Figure 3:
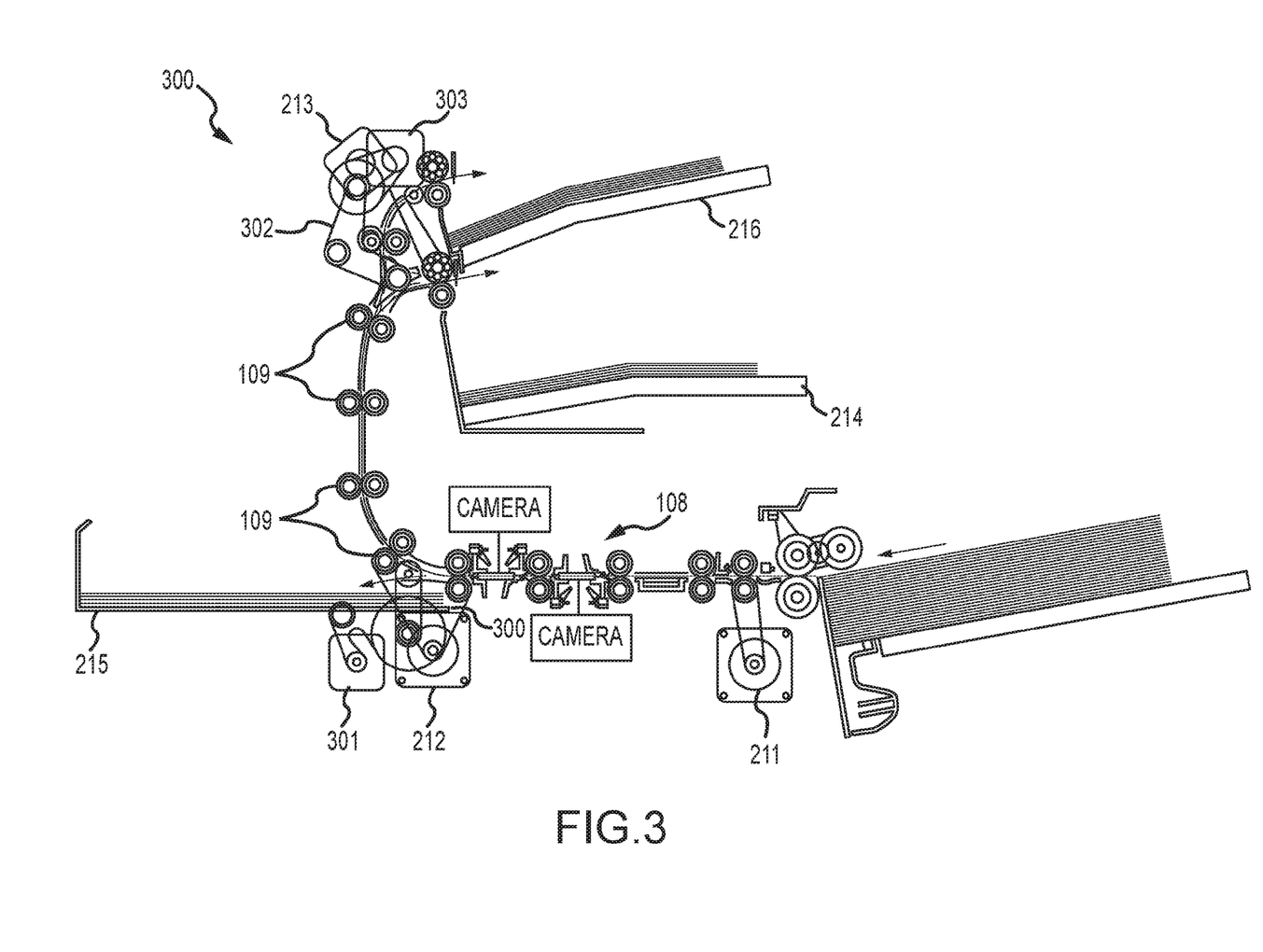
FIG. 3 illustrates switches in the system used to move a document sheet along the document transport path to an alternate output tray.

As shown in FIG. 3, transporting a sheet to an alternate output destination 215, 216 is achieved by having one or more switches 300, 302 along the paper path 108 to guide the paper to an alternate paper path section where it is driven by more rollers until it exits into an alternate tray 215, 216. The switches are driven to a primary path or alternate path position by switch drive motors 301, 303 in response to the destination decision made by the processor from the image data analyzed. As an example, the processor may determine from an analysis of the image data that the sheet includes a barcode. The processor may analyze or decode the barcode information, and compare it to barcode information stored in a memory accessible by the processor. When the barcode information from the analyzed image data matches barcode information stored in the memory, the processor implements predetermined sorting rules based on the stored barcode information to direct the sheet to a particular output tray. In addition to looking for a barcode, the processor may direct the scanned sheet to a particular output tray based on other recognized document characteristics from an analysis of the image data, such as document size, color, or inclusion of certain text or image content. In order to determine the sort criteria and analyze the image data to determine where the document should be sorted, the processing unit requires processing time. This processing time is variable depending on the computing power of the processor and the complexity of the image analysis performed.

Prior art systems performing sorting had very limited processing time, which was generally equal to the time it took a document to travel from the downstream camera to the point in the paper path where the alternate paper path switch was located. In addition to the overall scanner size disadvantages discussed above, this fixed, limited time to perform the processing limits the analysis and operations that can be performed while the document is in the scanner. In the systems and methods of the present invention, a "park and go" process can be performed where the drive system of the scanner is commanded to transport the sheet until the sheet's trailing edge has been moved to a point immediately downstream of the last camera position where it is then stopped or parked. Alternatively, the processor may command the motors the slow the rollers so that the sheet is transported at a reduced rate of speed sufficient to allow the processor to make the sorting determination before the sheet reaches the switching mechanism.

Figure 4:
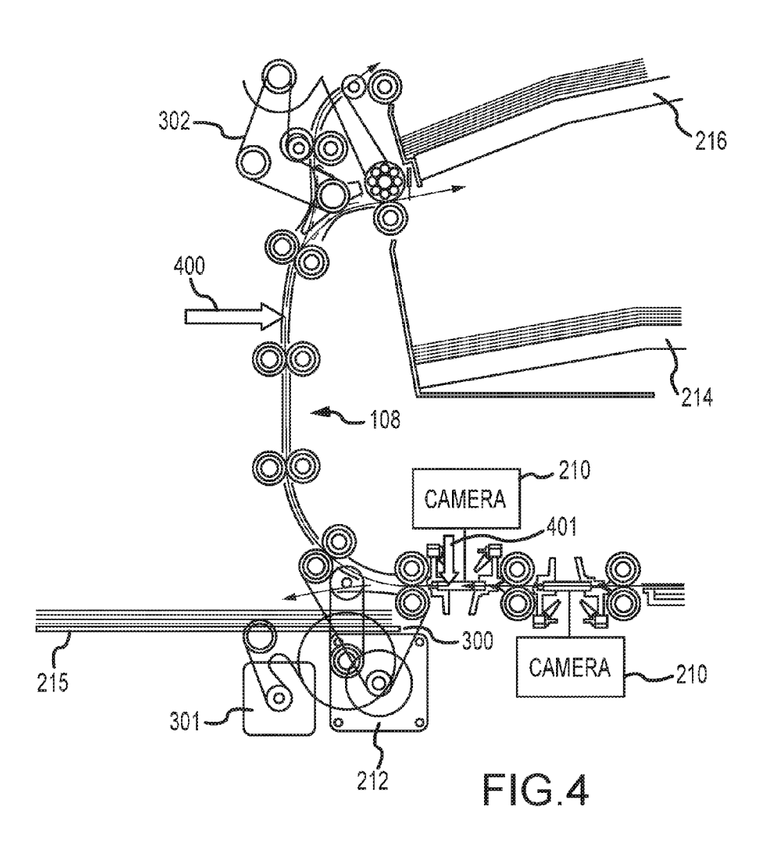
FIG. 4 shows an example of stopping a document sheet along the paper transport path after the sheet has been imaged by the last camera, allowing the processing unit to make an output tray destination determination.

FIG. 4 is an example of stopping a document sheet along the paper transport path 108 after the sheet has been imaged by the last camera, with the leading edge at position 400 and the trailing edge at position 401. FIG. 4 is an example of where a document whose length is not greater than the distance from the last camera to switching mechanism for a potential output tray would be stopped. This may occur, for example, when a document is scanned on US letter size in a landscape position. It may also occur when shorter documents are scanned.

Once the sheet has been stopped or parked, the Scanner's processing unit can take as much time as is necessary to complete any desired image analysis or processing before sending an instruction for the transport system to being moving the sheet onto the paper switch and into a selected output tray. Since this time can be as long or as short as needed for the processor to analyze and find the desired image information, the distance between the last camera and the alternate paper path switch only needs to be long enough to fit the document's length. In high volume production scanning, a large percentage of the documents scanned are 8.5×11" US Letter or 8.27"×11.69 "A4" International paper size. When these docs are fed in a landscape orientation, their length in the direction of paper travel is the 8.5" or 8.27" dimension. Therefore, the paper path length between the last camera and the alternate paper path switch needed to perform image analysis for sorting is only slightly larger than the sheet dimension of 8.5" or 8.27". Some distance greater than the sheet dimension is required to bring the document to a complete stop prior to its leading edge going past the switch point, but this can be very minimal.

After the image analysis has been performed and the decision as to which paper path to deliver the sheet to has been made, the appropriate paper path is selected by flipping the paper path switch to an alternate paper path or leaving it in the primary paper path position, as discussed below with respect to FIGS. 7-8. The paper path switch is typically a movable paper path blade like component that is moved into the desired position using a motor or solenoid or some other prime mover.

Figure 5:
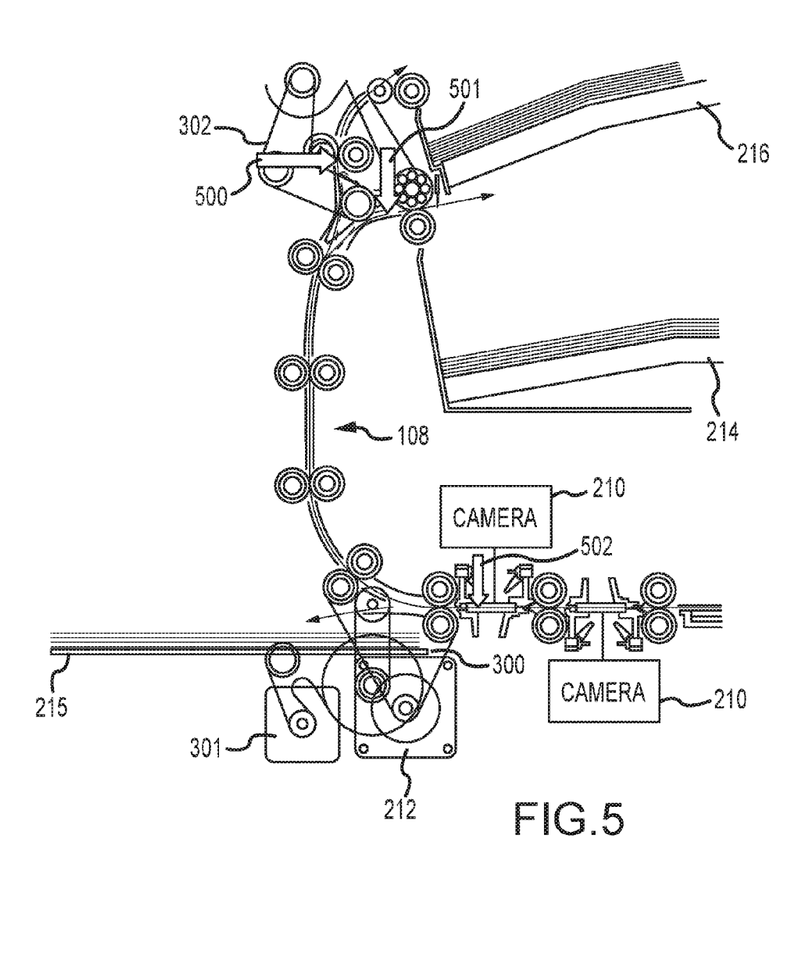
FIGS. 5 and 6 illustrate analyzing and sorting a document that is longer than the space available between the last camera and the switch by performing a stop, reverse and go procedure.
Figure 6:
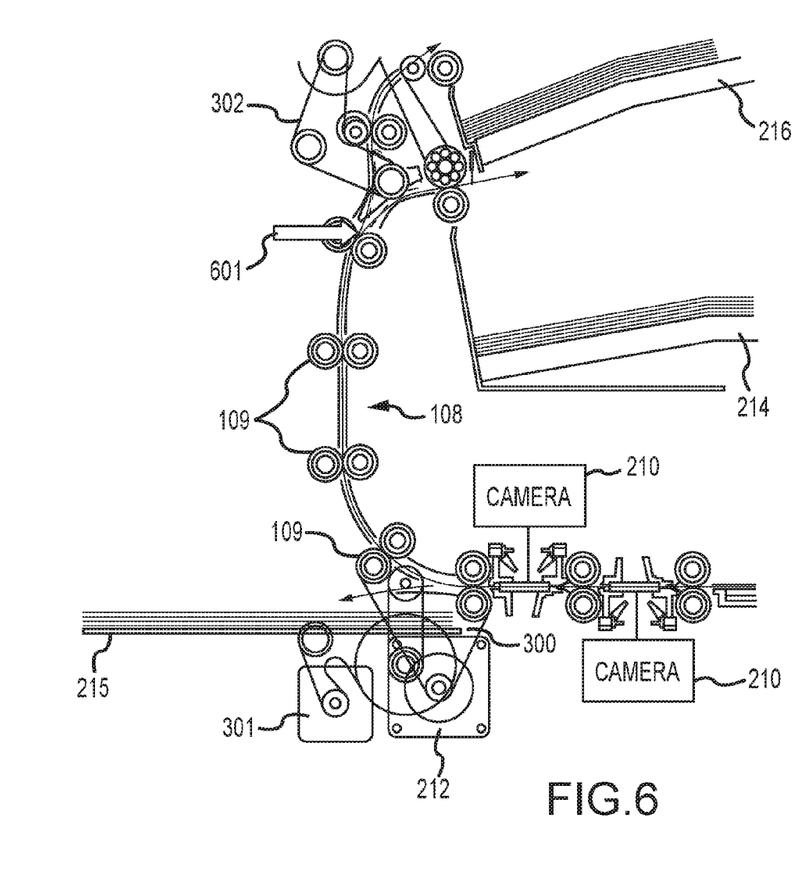

The system and method may also analyze and sort a document that is longer than the space available between the last camera and the switch point, as illustrated in FIGS. 5 and 6, by performing a stop, reverse and go. In this mode, the steps to feed the sheet until it's trailing edge is just past the last camera position are the same as described in the "park and go" method discussed with respect to FIG. 4. As shown in FIG. 5, the paper path switch position will be in one of its two positions as the leading edge of a given sheet is driven past it. This position can either be where it was put for the preceding sheet or where it was commanded to be by the processor. For instance, the starting position for the first sheet in every stack would likely be the position for the primary paper path and output destination. As shown in FIG. 5, the leading edge will be driven past the switch 302 position when the trailing edge of the sheet is stopped at a point immediately downstream of the last camera. When the switch 302 is in a position to direct the sheet to the primary output path, the leading edge of the sheet may be stopped at position 501 along a path leading to the primary output tray. When the switch 302 is in a position to direct the sheet to an alternate output path, the leading edge of the sheet may be stopped at a position 500 along a path leading to an alternative output tray. With the leading edge in position 500 or 501 past the switch, it is possible for the same image analysis and sorting decision making to commence. If the sorting decision has determined that this sheet must continue to the path that the sheet is already in, then there is no need to flip the switch and redirect it. However, because the paper is already downstream of the switch, it is not possible for the switch to be moved from its current path position if the image analysis determines the sheet should actually be sorted into a different tray.

In situations where the sorting decision would direct the sheet to the path that it is not already on, then the sheet's leading edge must be reversed to a point 601 where the switch 302 can be actuated as shown in FIG. 6. To accomplish this, the scanner's drive system will park the sheet as described in the park and go method. At the point the trailing edge is moved past the last camera the sheet is stopped or parked and the image analysis can commence as shown in FIG. 5 with the leading edge of the sheet at either position 500 or 501 past the switching mechanism depending on which output tray path position the switch is in. The central processing unit can determine the length of the sheet by looking at the timing for when the sheet's lead and trail edges were detected by the paper sensor described earlier. In conjunction with a software timer, this length can be determined. Since the sheet length is determined and the physical distance between the camera and paper path switch are known, the distance needed to reverse the sheet so that its leading edge is positioned before the switching mechanism can be calculated. The drive motor is then directed to move rollers so that the sheet moves the calculated distance in the reverse direction, ending at least at position 601 just before the switching mechanism 302. This may be achieved using a stepper motor and programming the number of steps and step rate. This could also be achieved using DC motor types in conjunction with an encoder. Once the sheet is in position 601, the switching mechanism may be changed to the desired position, and transport system is activated so that the sheet is again moved forward and delivered to the selected output destination.

Figure 7:
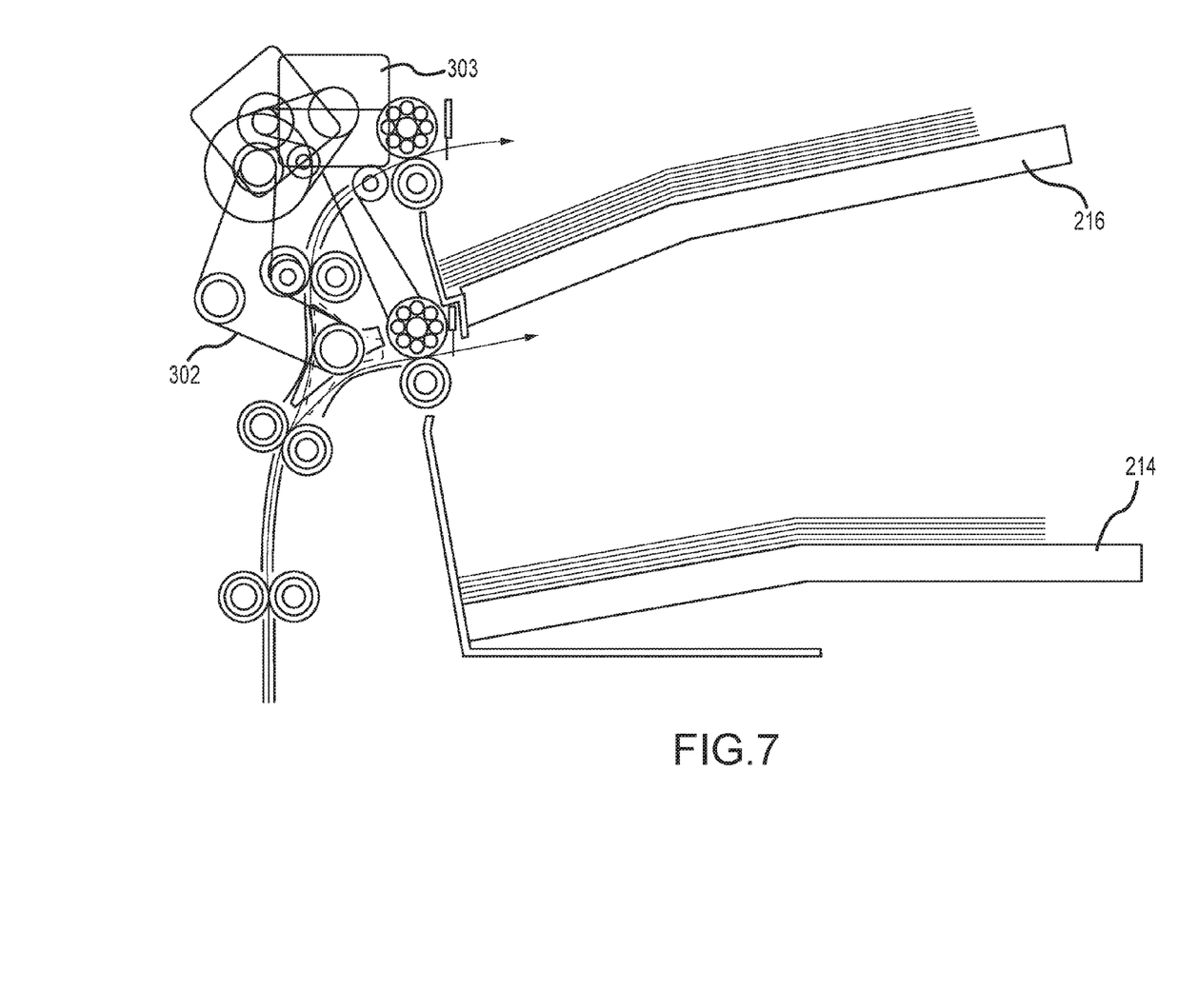
FIG. 7 illustrates the document scanning system with the switches in positions to move a document sheet into the primary output tray.
Figure 8:
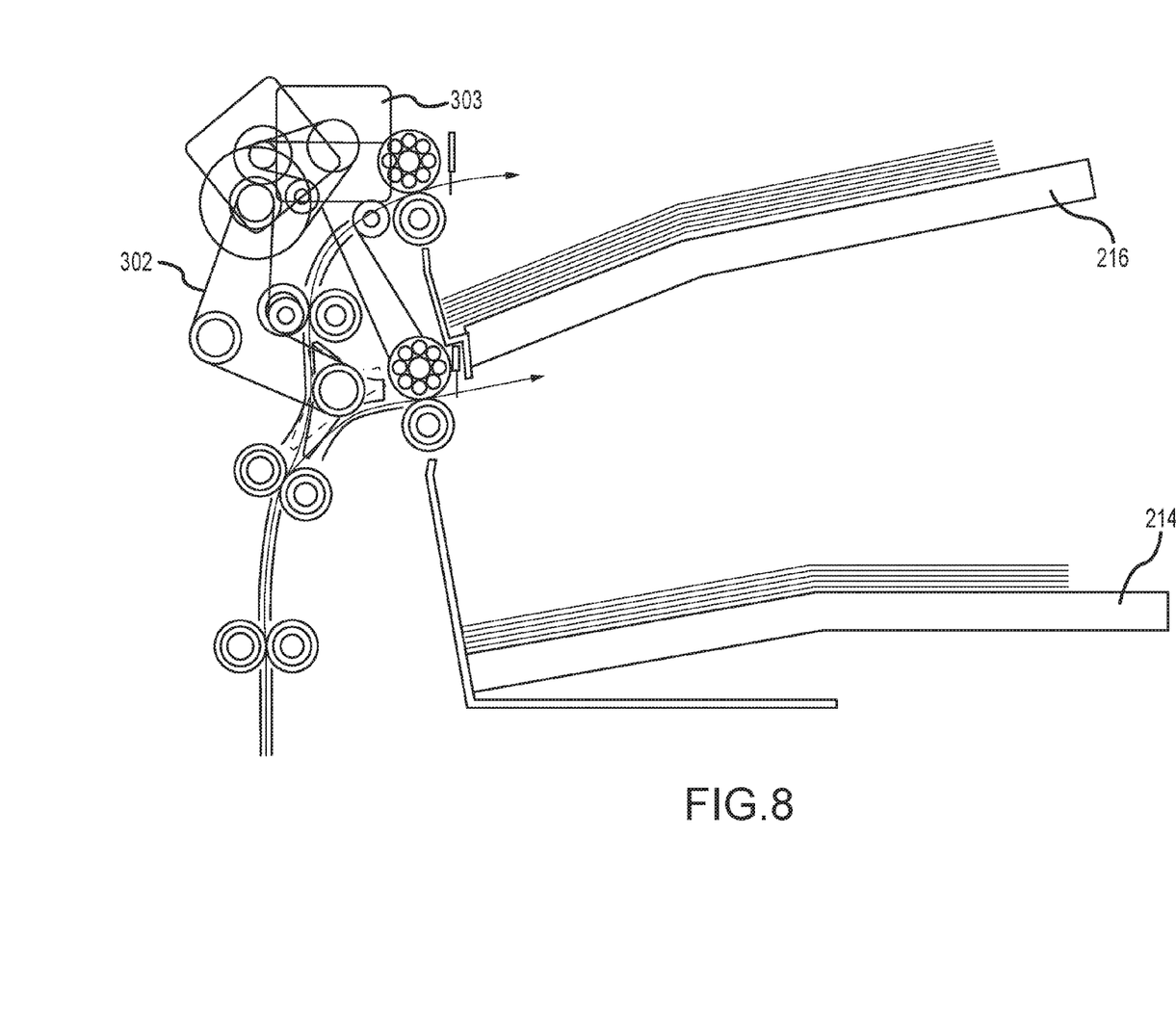
FIG. 8 illustrates the document scanning system with the switches in positions to move a document sheet into an alternative output tray.
Figure 9:
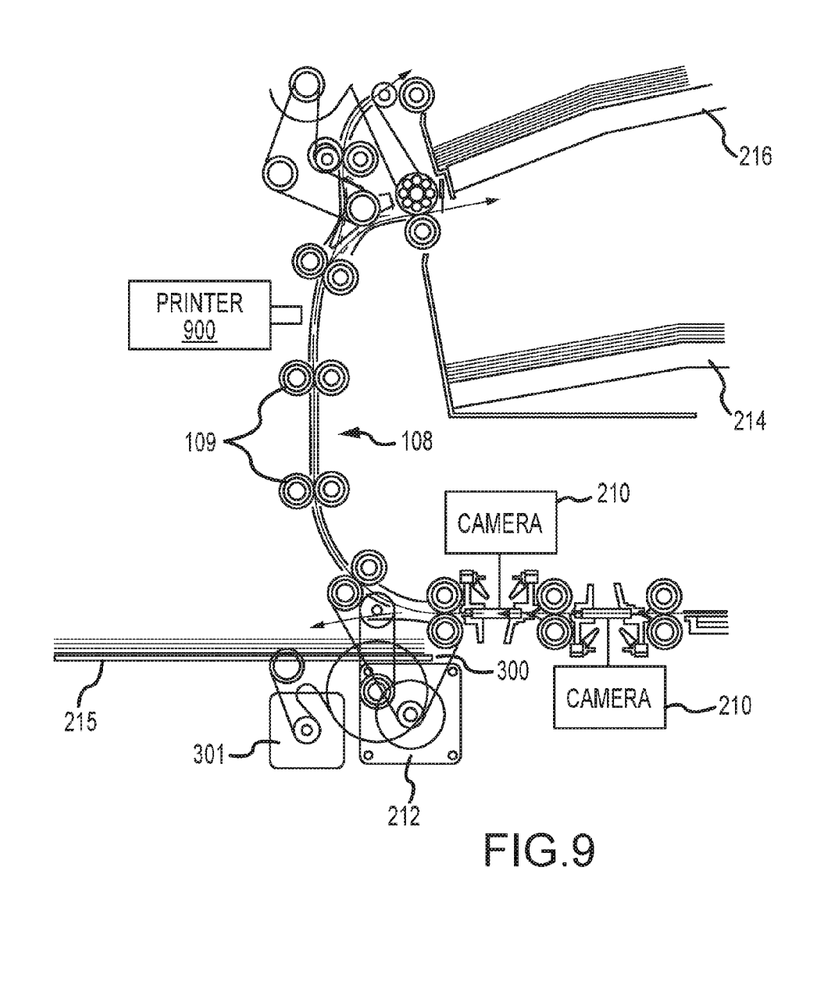
FIG. 9 illustrates how the system is configured to redirect the sheet into more than one alternative output tray, and further illustrates an example of placing a printer system along the paper path.

FIG. 7 illustrates the switch position and paper path the sheet takes when it is desired to direct the sheet into the primary output tray. FIG. 8 illustrates the switch position and paper path the sheet takes when it is desired to direct the sheet into an alternative output destination. As shown in FIG. 9, it is also possible to redirect the sheet into more than one alternative output tray 215, 216. When it is desired to direct the sheet into tray 215 just past the last camera, the sheet may either be directly fed into output tray 215 without stopping the document sheet and performing image analysis. This may be done when an operator manually selects this output tray before scanning the sheet, or when predetermined rules or conditions are met and recognized by the processor at the beginning of scanning that indicate the sheet should be directed to tray 215. It is also possible for the reverse process described above to be implemented after imaging the sheet and performing the image analysis by reversing the drive motors and rollers to move the document in a reverse direction along the transport path as described above.

A printer system 900 may be located downstream of the last camera 210, as seen in FIG. 9. The printer system may be located downstream of the last camera in any configuration of the system, and may also be located at other positions along the paper path. For example, the printer could be located between the two imaging cameras, such that anything printed on the document sheet would be captured by the second camera. The printer could also be located in the paper path before the cameras, such that both cameras capture anything printed on the document sheet. Using the park and go or park and reverse and go methods described previously, it is also possible to print variable data onto the sheet after it has been analyzed and is being advanced to the determined output destination. This printing could be useful in helping to visually identify the document after it is scanned. The printer may be, for example, an inkjet printer, laser printer, or ribbon printer equipped to print in one or more colors of ink. For example, in the image analysis the scanner's processing unit can detect and decode a bar code found in the image of the sheet. Decoding the bar code may provide a number value or series of alphanumeric characters that the bar code represented. These alphanumeric characters could then be printed onto the sheet before the sheet is delivered to the output destination. This printing would make it easier for an operator to read the value or characters if they needed to visually identify the document at some later time, such as to perform a rescan or produce the original because of a request to do so. In addition to printing bar code values, the scanner system may also analyze the image using OCR to find key information such as dates, names, account numbers, or dollar amounts located in structured or non-structured fields on the document. This key information detected in the document could then be printed in a more prominent fashion or in a particular location on the document for later reference and inspection by an operator or other person analyzing the scanned document. Alternatively, the document being scanned could include test scoring or voting type marks where a person would indicate his or her response to a question by filling in an area on the form with a pencil or other marker. Using the methods described above, the scanner system could analyze the image and score the test or record the voting selections. Based on that analysis, the printer could be programmed to print the result on the actual sheet. In addition, the test or voting forms could be sorted to a specific output destination if, during the image analysis, it was found that certain required fields were not filled out or incorrectly filled out. This would allow the scanner operator to know that these specific forms sent to an alternate output destination are rejected as having had incomplete or inaccurate information on them.

In addition to the scanner system making a destination selection or printing data in response to the image analysis, the scanner could also pause, transfer the image to a scanner operator control panel or to an attached host computer where it could be displayed to the operator for some form of intervention. For example, the image analysis could include detecting one or more image quality attributes that seem to be outside of some prescribed normal range. Examples might include too much noise in the image background, or an image that seems to have an irregular shape when it was expected to be rectangular. In this case, the scanner system could pause and display that image to the operator for disposition. The operator could accept the image after visually reviewing it or they could reject the image and command the scanner to deliver the rejected sheet to an alternate output destination (tray). Once delivered to the alternate destination (tray) the operator might remove the sheet and try to rescan the sheet using the same or different scanner parameters to obtain an acceptable image. Additionally, stopping the sheet within the transport to enable image analysis prior to delivering the sheet or advancing the next sheet provides time for the processor to attach meta data to the image file stored in a memory or transmitted from the scanner device to another computing device or electronic memory.

The invention claimed is:

1. A system for sorting documents into one of a plurality of output trays on a scanning device, the system comprising:
   an input tray for holding document sheets to be scanned;
   a feeder roller configured to transport a document sheet from the input tray into a paper transport path within the scanner;
   drive motors and transport rollers configured to move the document sheet along the paper transport path;
   detection sensors configured to detect the lead and trailing edges of the document sheet transported along the paper transport path;
   at least one imaging device configured to image the sheet and provide digital image data to a processor; and
   at least one switching mechanism configured to alter the paper transport path to end in a selected one of the plurality of output trays, wherein output trays are selected based on analysis of the digital image data by the processor;
   wherein at least one detection sensor is located at a position past the switching mechanism;
   wherein, when the lead edge is past the switching mechanism, the motor is configured to reverse the direction of transport of the document sheet within the scanning device until the leading edge is at a position before the switching mechanism; and
   wherein the processor is configured to:
      determine the length of the document sheet and calculate the distance needed to reverse the sheet so that its leading edge is positioned before the switching mechanism; and
      direct the drive motors to move the rollers so that the sheet moves the calculated distance in the reverse direction, ending at least at a position just before the switching mechanism.

2. The system of claim 1, wherein the processor is configured to direct the drive motors to stop transport of the paper along the path until analysis of the digital image data is complete and an output tray is selected.

3. The system of claim 1, wherein the processor is configured to analyze the digital image data for content, and wherein the output tray is selected based on the content.

4. The system of claim 3, wherein the content includes the presence of a bar code in the digital image data.

5. The system of claim 3, further comprising a printer located along the path and configured to print additional information onto the document based on the analysis of the image data.

6. The system of claim 1, wherein the switching mechanism is configured to change its selected position so that it will direct the document sheet into an alternate output tray, and wherein the motor is configured to reverse direction of the transport to sort the document sheet through the switching mechanism and into the alternate output tray.

7. A method for sorting documents into one of a plurality of output trays on a scanning device, the method comprising:
   providing at least one document sheet in an input tray of the scanning device;
   transporting the at least one document sheet from the input tray into a paper transport path within the scanner;
   transporting the document sheet along the paper transport path using one or more drive motors and transport rollers;

detecting the lead and trailing edges of the document sheet transported along the paper transport path;

imaging the sheet with an imaging device along the transport path and provide digital image data to a processor;

selecting a position of at least one switching mechanism to move document along a paper transport path ending in a selected one of the plurality of output trays, wherein output trays are selected based on analysis of the digital image data by the processor, and wherein detecting the leading edge of the document sheet comprising detecting whether the leading edge is at a position past the location of the switching mechanism;

when the leading edge is detected to be past the position of the switching mechanism, determining the length of the document sheet and calculating the distance needed to reverse the sheet so that its leading edge is positioned before the switching mechanism; and directing the drive motors to move the rollers so that the sheet moves the calculated distance in the reverse direction, ending at least at a position just before the switching mechanism.

8. The method of claim 7, wherein the processor directs the drive motors to stop transport of the paper along the path until analysis of the digital image data is complete and an output tray is selected.

9. The method of claim 7, wherein the digital image data is analyzed for content, and wherein the output tray is selected based on the content.

10. The method of claim 9, wherein the content includes the presence of a bar code in the digital image data.

11. The method of claim 9, further comprising including a printer located along the path, wherein the printer prints additional information onto the document based on the analysis of the image data.

12. The method of claim 7, further comprising continuing the document along the transport path without changing the switch mechanism position when the switch is in position to sort the document into the desired output tray.

13. The method of claim 7, further comprising changing the selected position of the switching mechanism so that it will direct the document sheet into an alternate output tray, and again reversing direction of the transport to sort the document sheet through the switching mechanism and into the alternate output tray.

* * * * *